United States Patent [19]

Hayashi et al.

[11] Patent Number: 4,745,748

[45] Date of Patent: May 24, 1988

[54] CLUTCH VALVE SYSTEM FOR STATIC HYDRAULIC CONTINUOUSLY VARIABLE TRANSMISSION

[75] Inventors: Tsutomu Hayashi, Tokyo; Kazuhito Ito, Saitama; Yoshihiro Yoshida; Mitsuru Saito, both of Tokyo, all of Japan

[73] Assignee: Honda Giken Kogyo Kabushiki Kaisha, Tokyo, Japan

[21] Appl. No.: 68,734

[22] Filed: Jun. 30, 1987

Related U.S. Application Data

[63] Continuation of Ser. No. 879,335, Jun. 27, 1986, abandoned.

[30] Foreign Application Priority Data

Jun. 28, 1985 [JP] Japan .................................. 60-142253
Jul. 17, 1985 [JP] Japan .................................. 60-157791

[51] Int. Cl.$^4$ ............................................. F16D 39/00
[52] U.S. Cl. ......................................... 60/489; 91/506
[58] Field of Search ................. 60/487, 488, 489, 490, 60/443; 91/506

[56] References Cited

U.S. PATENT DOCUMENTS

| | | | |
|---|---|---|---|
| 24,317 | 5/1857 | Schott | 60/53 |
| 2,388,462 | 11/1945 | Beeh | 103/173 |
| 2,395,980 | 3/1946 | Wahlmark | 60/53 |
| 2,651,386 | 9/1953 | Rossell | 188/98 |
| 2,662,375 | 12/1953 | Postel et al. | 60/490 X |
| 2,683,421 | 7/1954 | Woydt | 91/481 |
| 2,844,002 | 7/1958 | Pavesi | 60/53 |
| 2,907,230 | 10/1959 | Kollmann | 74/687 |
| 2,984,070 | 5/1961 | Bauer | 60/53 |
| 3,036,434 | 5/1962 | Mark | 60/53 |
| 3,054,263 | 9/1962 | Budzich | 60/53 |
| 3,131,539 | 5/1964 | Creighton | 60/53 |
| 3,133,418 | 5/1964 | Froebe | 60/53 |
| 3,143,858 | 8/1964 | Roeske | 60/53 |
| 3,165,892 | 1/1965 | Roberts | 60/53 |
| 3,170,297 | 2/1965 | Larson | 60/53 |
| 3,175,363 | 3/1965 | Molly | 60/53 |
| 3,187,868 | 6/1965 | Gantzer | 192/101 |
| 3,213,619 | 10/1965 | Creighton | 60/53 |
| 3,274,947 | 9/1966 | Jonkers | 103/162 |
| 3,313,108 | 4/1967 | Allgaier | 60/53 |
| 3,382,813 | 5/1968 | Schauer | 103/162 |
| 3,416,312 | 12/1968 | Margolin | 60/53 |
| 3,543,514 | 12/1970 | Reimer | 60/53 |
| 3,620,130 | 11/1971 | Roberts | 91/506 |
| 3,698,189 | 10/1972 | Reimer | 60/53 A |
| 3,834,164 | 9/1974 | Ritter | 60/492 |
| 4,080,992 | 3/1978 | Niederer | 137/636 |
| 4,170,279 | 10/1979 | Pelletier | 188/300 |

FOREIGN PATENT DOCUMENTS

| | | |
|---|---|---|
| 23390 | 8/1936 | Australia . |
| 143400 | 5/1950 | Australia . |
| 231526 | 4/1959 | Australia . |
| 268529 | 11/1963 | Australia . |
| 143921 | 12/1935 | Austria . |

(List continued on next page.)

Primary Examiner—Edward K. Look
Attorney, Agent, or Firm—Lyon & Lyon

[57] ABSTRACT

A clutch valve system for use in a static hydraulic continuously variable transmission in which a hydraulic closed circuit is formed between a swashplate type hydraulic pump and a swashplate type hydraulic motor, wherein a first annular oil chamber and a second annular oil chamber are concentrically defined in the pump cylinder adjacent to annularly arranged cylinder bores of a pump cylinder in the hydraulic pump, the first oil chamber being adapted to be connected to the cylinder bores which are in a discharge stroke and the second oil chamber being adapted to be connected to the cylinder bores which are in a suction stroke; a plurality of clutch valves are radially arranged in the pump cylinder for providing the communication or discommunication between both the oil chambers by the radial movement thereof; and a clutch control ring engaged with the clutch valves for relative rotation therebetween so as to surround these clutch valves is pivoted on a fixing structure for pivotal movement between a clutch ON position in which it brings all the clutch valves into a closed state in the diametrical direction of the pump cylinder and a clutch OFF position in which it brings some of the clutch valves into an opened state.

4 Claims, 11 Drawing Sheets

FOREIGN PATENT DOCUMENTS

| | | |
|---|---|---|
| 240661 | 6/1965 | Austria . |
| 317649 | 10/1919 | Fed. Rep. of Germany . |
| 880989 | 7/1949 | Fed. Rep. of Germany . |
| 1200135 | 9/1965 | Fed. Rep. of Germany . |
| 1480553 | 6/1969 | Fed. Rep. of Germany . |
| 1500480 | 7/1969 | Fed. Rep. of Germany . |
| 1625039 | 5/1970 | Fed. Rep. of Germany . |
| 3139191 | 4/1983 | Fed. Rep. of Germany . |
| 791714 | 5/1935 | France . |
| 32-7159 | 4/1957 | Japan . |
| 41-3208 | 9/1966 | Japan . |
| 46-11852 | 3/1971 | Japan . |
| 56-143856 | 11/1981 | Japan . |
| 57-70968 | 5/1982 | Japan . |
| 59-38467 | 9/1984 | Japan . |
| 473997 | 9/1969 | Switzerland . |
| 535555 | 4/1941 | United Kingdom . |
| 574991 | 1/1946 | United Kingdom . |
| 835936 | 5/1960 | United Kingdom . |
| 902978 | 8/1962 | United Kingdom . |
| 1021873 | 3/1966 | United Kingdom . |
| 1222200 | 2/1971 | United Kingdom . |
| 1282094 | 3/1972 | United Kingdom . |
| 2104976 | 3/1983 | United Kingdom . |

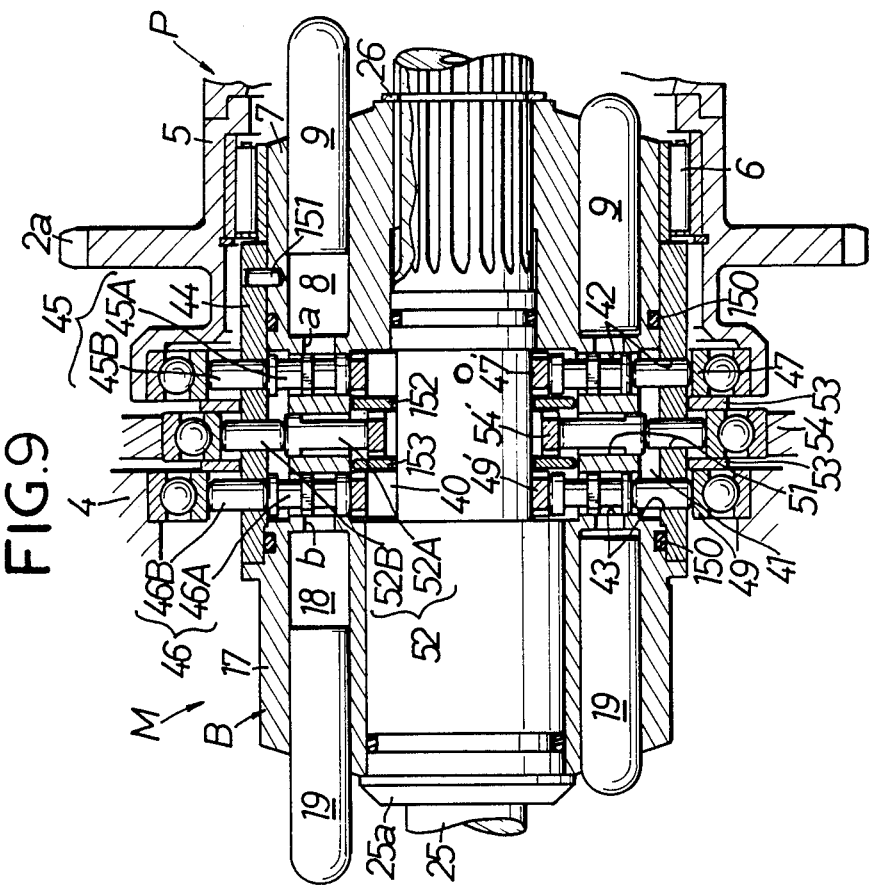
FIG.9
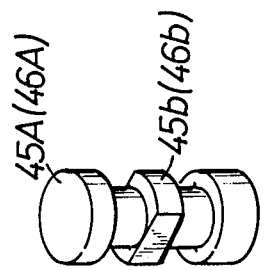
FIG.10
FIG.11

4,745,748

CLUTCH VALVE SYSTEM FOR STATIC HYDRAULIC CONTINUOUSLY VARIABLE TRANSMISSION

This application is a continuation of Ser. No. 879,335 filed June 27, 1986, now abandoned.

BACKGROUND OF THE INVENTION

1. Field of the Invention

The present invention relates to a clutch valve system for use in a static hydraulic continuously variable transmission in which a hydraulic circuit is formed between a swashplate type hydraulic pump and a swashplate type hydraulic motor, wherein the short-circuiting and the disconnection between the discharge side and the suction side of a hydraulic pump are controlled to control the transmission of power from the hydraulic pump to the hydraulic motor.

2. Description of the Prior Art

Such a conventional clutch valve system is constituted, as described in Japanese Patent Publication No. 38467/84, such that a higher pressure oil chamber connected to a discharge port of a hydraulic pump and a lower pressure oil chamber connected to a suction port of the hydraulic pump are defined at the end of a hydraulic motor, and clutch valves for permitting the short-circuiting and disconnection between both the oil chambers are disposed at the central portion of a support shaft for the hydraulic motor.

With the conventional arrangement, the clutch valves and a system for operating the clucth valves are axially protruded from the end of the hydraulic motor, resulting in an increased entire length of the transmission. This is a hindrance to a compact construction of transmission. Particularly, when the hydraulic pump and the hydraulic motor are coaxially arranged, the employment of the conventional clutch valve system results in a further increased entire length of the transmission.

SUMMARY OF THE INVENTION

It is therefore an object of the present invention to provide a clutch valve system as described above which can bring about the reduction in entire length of a transmission.

According to the present invention, the above object is accomplished by providing a clutch valve system for use in a static hydraulic continuously variable transmission in which a hydraulic closed circuit is formed between a swashplate type hydraulic pump and a swashplate type hydraulic motor, wherein a first annular oil chamber and a second annular oil chamber are concentrically defined in the pump cylinder adjacent to annularly arranged cylinder bores of a pump cylinder in the hydraulic pump, the first oil chamber being adapted to be connected to the cylinder bores which are in a discharge stroke and the second oil chamber being adapted to be connected to the cylinder bores which are in a suction stroke; a plurality of clutch valves are radially arranged in the pump cylinder for providing the communication or discommunication between both the oil chambers by the radial movement thereof; and a clutch control ring engaged with the clutch valves for relative rotation therebetween so as to surround these clutch valves is pivoted on a fixing structure for pivotal movement between a clutch ON position in which it brings all the clutch valves into a closed state in the diametrical direction of the pump cylinder and a clutch OFF position in which it brings some of the clutch valves into an opened state.

If the clutch control ring is shifted in the clutch OFF position, some of the clutch valves permit the first higher pressure oil chamber and the second lower pressure oil chamber to be short-circuited therebetween. Therefore, the working oil flows out of the first oil chamber into the second oil chamber, making it impossible to supply the hydraulic oil from the hydraulic pump to the hydraulic motor. Thus, the transmission of power can be cut off between the hydraulic pump and the hydraulic motor.

If the clutch control ring is returned to the clutch ON position, the short-circuit between both the oil chambers is shut off by all the clutch valves and thus, the transmission of power can be restarted from the hydraulic pump to the hydraulic power.

Since the plurality of clutch valves are radially arranged in the pump cylinder and moreover, the clutch control ring encircling the clutch valves is operable for swinging movement in the diametrical direction of the pump cylinder, the entire length of the transmission can not be increased due to these components.

With the inner ends of all the clutch valves facing the inner oil chamber, the hydraulic pressure of such hydraulic oil chamber always equally acts on the inner ends of all the clutch valves and hence, the urging forces exerted on the clutch control ring by all the clutch valves are balanced so that the hydraulic pressure of that oil chamber may not become a resistance to the operation of the clutch control ring.

The above and other objects, features and advantages of the invention will become apparent from reading of the following description taken in conjunction with the accompanying drawings.

BRIEF DESCRIPTION OF THE DRAWINGS

FIG. 1 is a vertical sectional plan view of a static hydraulic continuously variable transmission carried in a power transmitting system of a motorcycle;

FIG. 2 is a partially vertical sectional back view of the transmission;

FIGS. 3, 4 and 5 are sectional views taken along the lines III—III, IV—IV and V—V in FIG. 1, respectively;

FIG. 6 is a sectional view taken along the line VI—VI in FIG. 2;

FIG. 7 is a partially plan view of the transmission;

FIG. 8 is a block diagram of an automatic control circuit in the transmission;

FIG. 9 is a vertical sectional view of details of a static hydraulic continuously variable transmission according to a second embodiment of the present invention;

FIG. 10 is a perspective view of a first (or second) dispensing valve shown in FIG. 9;

FIG. 11 is a perspective view of a clutch valve shown in FIG. 9; and

DESCRIPTION OF THE PREFERRED EMBODIMENT

Figure 1:
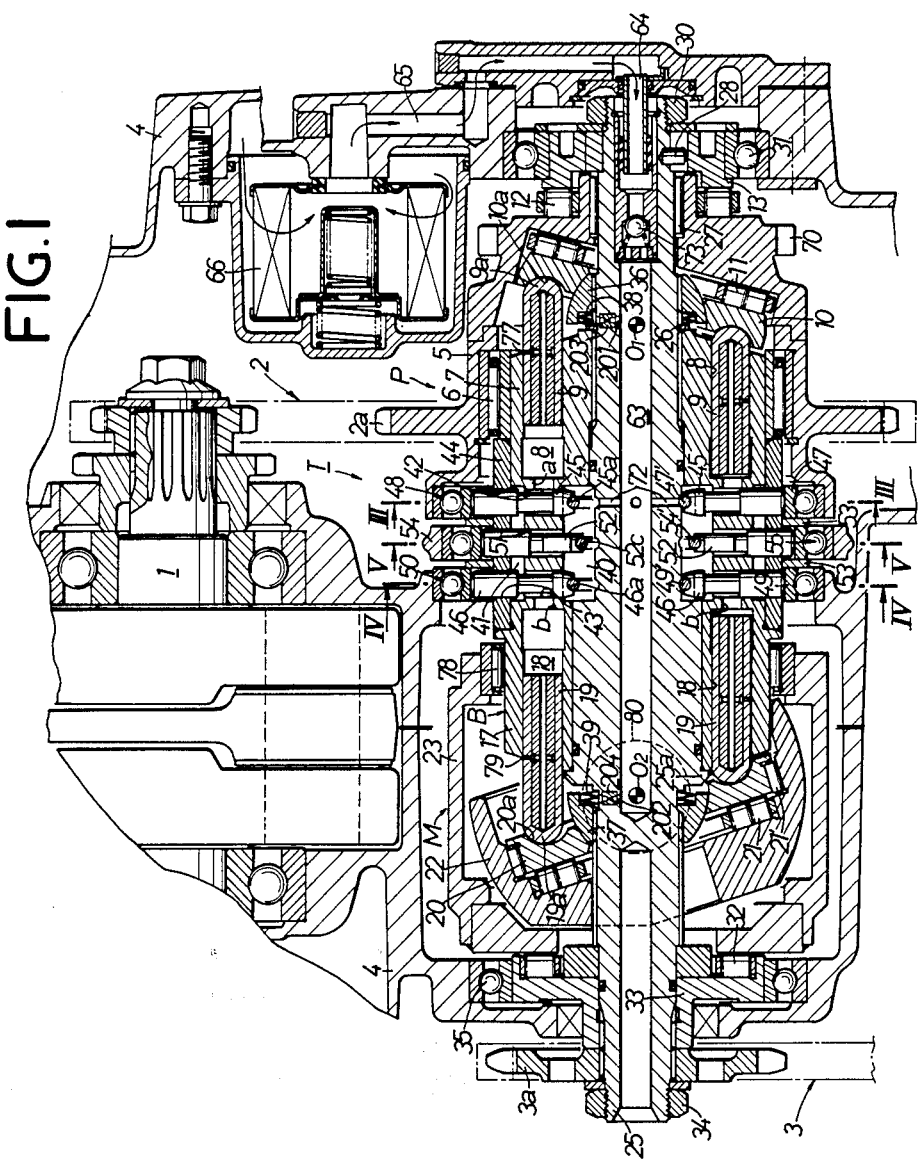
FIGS. 1 to 8 illustrate a first embodiment of the present invention.

Referring first to FIG. 1 illustrating a first embodiment of the present invention, the power of an engine in a motorcycle is transmitted from a crank shaft 1 through a primary chain-type reduction gear 2, a static hydraulic continuously variable transmission T and a secondary chain-type reduction gear 3 to a rear wheel which is not shown.

The continuously variable transmission T comprises a constant capacity swashplate-type hydraulic pump P and a variable capacity swashplate-type hydraulic motor M, and is contained with a casing provided by a crank case 4 which carried the crank shaft 1.

The hydraulic pump p comprises a cup-like input member 5 integrally provided with an input sprocket 2a of the primary reduction gear 2, a pump cylinder 7 relatively rotatably fitted in the inner peripheral wall of the input member 5 through a needle bearing 6, pump plungers 9, 9 . . . slidably fitted in a plurality and odd-number of annularly arranged cylinder bores 8, 8 provided in the pump cylinder 7 to surround the rotational center thereof, and a pump swashplate 10 adapted to abut against the outer ends of the pump plungers 9, 9 . . .

At its back surface, the pump swashplate 10 is rotatably supported through thrust roller bearing 11 on the inner end wall of the inner member 5 in an attitude inclined about a phantom trunnion axis O1 perpendicular to the axis of the pump cylinder 7 by a predetermined angle with respect to the axis of the pump cylinder 7, so that during rotation of the input member 5, the pump plungers 9, 9 . . . can be reciprocally moved to provide repeated suction and discharge strokes.

It is to be noted that a spring for biasing the pump plunger 9 toward the expansion thereof may be mounted in compression in the cylinder bore 8 to improve the ability of the pump plunger 9 to follow the pump swashplate 10.

The back surface of the input member 5 is carried through a thrust roller bearing 12 on a support sleeve 13.

The hydraulic motor M comprises a motor cylinder 17 coaxially disposed leftward from the pump cylinder 7, motor plungers 19, 19 . . . slidably fitted in a plurality and odd-number of annularly arranged cylinder bores 18, 18 . . . respectively provided in the motor cylinder 17 to surround the rotational center thereof, a motor swashplate 20 adapted to abut against the outer ends of the motor plungers 19, 19 . . . , a swashplate holder 22 for carrying the back and outer peripheral surfaces of the motor swashplate 20 through a thrust roller bearing 21 and a radial roller bearing 21', and a cup-like swashplate anchor 23 for supporting the swashplate holder 22.

The motor swashplate 20 is tiltingly movable between an upright position in which it is located perpendicularly to the axis of the motor cylinder 17 and a tilted position in which it is inclined at a certain angle, and when in the tilted position, the motor swashplate 20 enables the motor plungers 19, 19 . . . to be reciprocally moved with the rotation of the motor cylinder 17, thereby to provide repeated expansion and contraction strokes.

It should be understood that a spring for biasing the motor plunger 19 toward the expansion thereof to improve the ability of the motor plunger 19 to follow the motor swashplate 20.

The pump cylinders 7 and 17 constitute an integral cylinder block B, and an outer shaft 25 is passed through the central portion of the cylinder block B. The motor cylinder 17 is located with its outer end allowed to bear against a flange 25a integrally formed on the outer periphery of the output shaft 25, while the pump cylinder 7 is splined-fitted to the output shaft 25, and a Cir-clip abuting against the outer end of the pump cylinder 7 is locked on the output shaft 25, whereby the cylinder block B is secured on the output shaft 25.

The output shaft is also passed through the input member 5 and carries such member for rotating movement through a needle bearing 27.

The support sleeve 13 is fitted through a key 28 on the outer periphery at the right end of the output shaft 25 and secured thereon by a nut 30. The output shaft is rotatably journaled at its right end on the crank case 4 through the support sleeve 13 and a roller bearing 31.

In addition, the output shaft 25 is passed through the motor swashplate 20, the swashplate holder 22 and the swashplate anchor 23 at their central portions, and a support sleeve 33 for supporting the back surface of the swashplate anchor 23 through a thrust roller bearing 32 is splined fitted over the output shaft 25 at the left and thereof and secured thereon together with the input sprocket 31 of the secondary reduction gear 3 by a nut 34. The output shaft 25 is rotatably supported at its left end on the crank case through the support sleeve 33 and a roller bearing 35.

A hemispherical aligning member 36 is slidably fitted over the output shaft 25 and adapted to engage the inner peripheral surface of the pump swashplate 10 for relative tilting movement in all directions. The aligning member 36 urges the pump swashplate 10 against the thrust roller bearing 11 by the force of a plurality of Belleville springs 38, thereby constantly providing an aligning effect on the pump swashplate 10.

In addition, a hemispherical aligning member 37 is also slidably fitted over the output shafts 25 and adapted to engage the inner peripheral surface of the motor swashplate 20 for relative tilting movement in all directions. The aligning member 37 urges the motor swashplate 20 against the thrust roller bearing 21 by the force of a plurality of Belleville springs 39, thereby constantly providing an aligning effect on the motor swashplate 20.

For the purpose of enhancing the aligning effect on each the swashplates 10 and 20 and also preventing the slipping in the rotational direction between the pump swashplate 10 and each of the pump plungers 9, 9 . . . and between the motor swashplate 20 and each of the motor plungers 19, 19 . . . , spherical recesses 10a and 20a, in which spherical ends 9a and 19a of the corresponding plungers 9 and 19 are engaged, are defined in the swashplates 10 and 20, respectively. In this case, the spherical recess 10a, 20a is established with a radius of curvature larger than that of the spherical end 9a, 19a, so that the proper engagement with the spherical end 9a, 19a may be insured even in any rotational position of the swashplate 10, 20.

A hydraulic closed circuit is formed between the hydraulic pump P and the hydraulic motor M in the following manner.

Provided in the cylinder block B between the cylinder bores 8, 8 . . . of the pump cylinder 7 and the cylinder bores 18, 18 . . . of the motor cylinder 17 are annular inner and outer hydraulic oil chambers 40 and 41 coaxially arranged around the output shaft 25; first and second valve bores 42, 42 . . . and 43, 43 . . . radially penetrating the annular partition wall between both the oil chambers 40 and 41 and the outer peripheral wall of the outer hydraulic chamber 41 and provided in the same number respectively as the number of the cylinder bores 8, 8 . . . and 18, 18 . . . ; a number of pump ports a, a . . . permitting the intercommunication of the adjacent cylinder bores 8, 8 . . . and first valve bores 42, 42 . . . ; and a number of motor ports b, b . . . permiting the inter-communication of the adjacent cylinder bores 18, 18 . . . and second valve bores 43, 43 . . . In this case, the inner oil chamber 40 is made by grooving between the respective opposed peripheral surfaces of the cylinder block B and the output shaft 25, while the outer oil chamber 41 is made by grooving between the respective opposed peripheral surfaces of the cylinder block B and the sleeve 44 fitted over and welded to the outer periphery of the cylinder block B.

First dispensing valves 45, 45 . . . are slidably fitted in the first valve bores 42, 42 . . . , respectively, while second dispensing valves 46, 46 . . . are slidably fitted in the second valve bores 43, 43 . . . , respectively.

Each first dispensing valve 45 is formed into a spool type. When the first valve 45 assumes a radially outer position, the corresponding pump port a is brought into communication with the outer oil chamber 41 and out of communication with the inner oil chamber 40, and the corresponding cylinder bore 8 is brought into communication with only the outer oil chamber 41. On the other hand, when the first dispensing valve 45 assumes a radially inner position, the corresponding pump port a is brought into communication with the inner oil chamber 40 and out of communication with the outer oil chamber 41, and the corresponding cylinder bore 8 is brought into communication with only the inner oil chamber 40.

Figure 3:
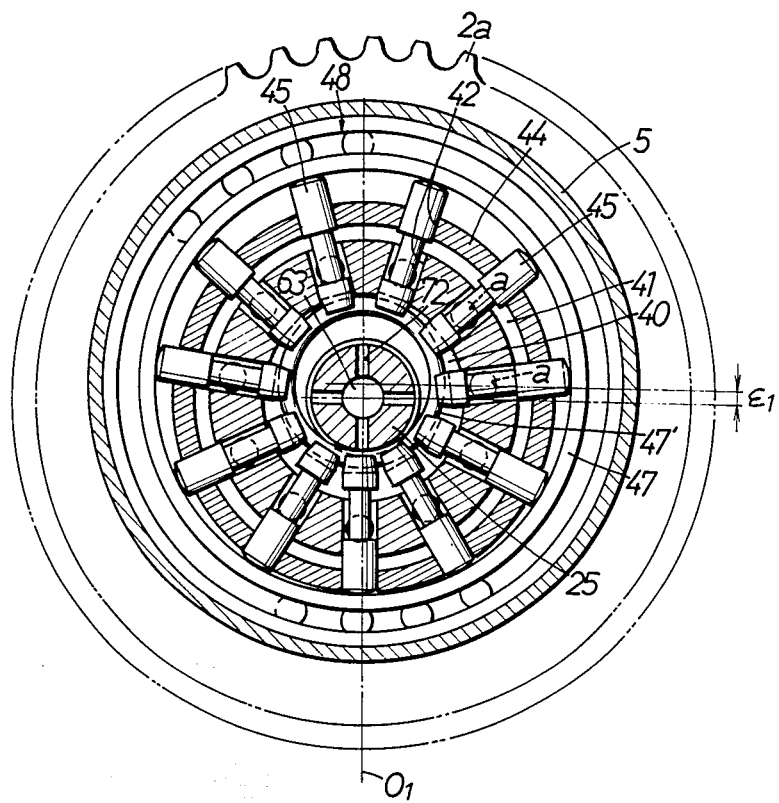

To provide such an operation to each first dispensing valve 45, a first eccentric ring 47 is engaged with the outer ends of the first dispensing valves 45, 45 . . . to surround the valves 45, and a follower ring 47' concentric to the eccentric ring 47 is disposed inside the first dispensing valves 45, 45 . . . and engaged in engage grooves 45a, 45a . . . at the inner ends thereof (see FIG. 3). The follower ring 47' is formed from a steel wire and has a single cut to repel the first dispensing valves 45, 45 . . . toward the engagement with the first eccentric ring 47.

The first eccentric ring 47 comprises an inner race of a ball bearing 48 fitted in the input member 5 and disposed eccentrically displaced a given distance $\epsilon1$ from the center of the output shaft 35 along the phantom trunnion axis O1 of the pump swashplate 10, as shown in FIG. 3. Accordingly, when the relative rotation occurs between the input member 5 and pump cylinder 7, each first dispensing valve 45 is reciprocally moved within the valve bore 42 thereof between the outer and inner positions with a stroke twice as long as the eccentric amount $\epsilon1$ of the first eccentric ring 47.

Each second dispensing valve 46 is formed into a spool type in the same manner as the first dispensing valve 45. When the second dispensing valve 46 assumes a radially outer position in the second valve bore 43, the corrsponding motor port b is brought into communication with the outer oil chamber 41 and out of communication with the inner oil chamber 40, and the corresponding cylinder bore 18 is brought into communication with only the outer oil chamber 41, whereas when the second dispensing valve 46 assumes a radially inner position in the second valve bore 43, the corrsponding motor port b is brought into communication with the inner oil chamber 40 and out of communication with the inner oil chamber 41, and the corresponding cylinder bore 18 is brought into communication with only the inner oil chamber 40.

Figure 4:
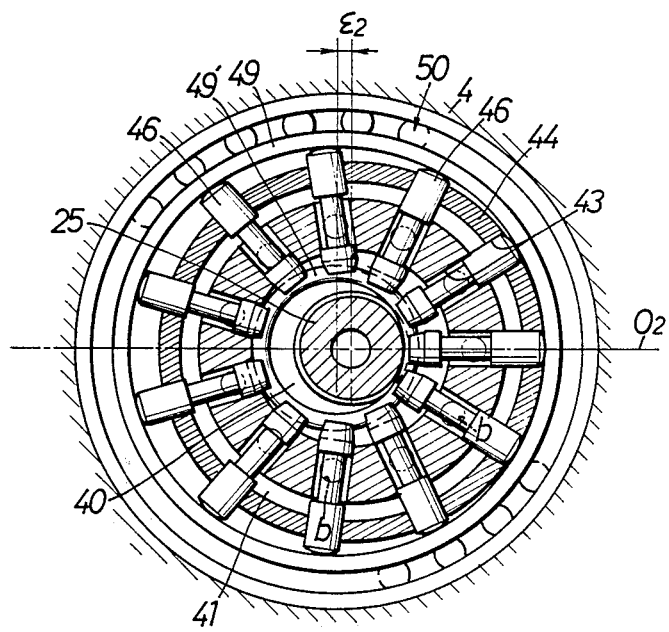

To provide such an operation to each first dispensing valve 46, a second eccentric ring 49 is engaged with the outer ends of the second dispensing valves 46, 46 . . . to surround these valves, and a follower ring 49' concentric to the eccentric ring 49 is disposed inside the second dispensing valves 46, 46 . . . and engaged in engage grooves 46a, 46a . . . at the inner ends thereof (see FIG. 4). The follower ring 49' is formed from a steel wire and has a single cut to repel the second dispensing valves 46, 46 . . . toward the engagement with the second eccentric ring 49.

The second eccentric ring 49 comprises an inner race of a ball bearing 50 fitted in the crank case 4 and disposed eccentrically displaced a given distance $\epsilon2$ from the center of the output shaft 25 along the tilting axis O2 of the motor swashplate 20. Accordingly, when the motor cylinder 17 is rotated, each second dispensing valve 46 is reciprocally moved within the valve bore 43 thereof between the outer and inner positions with a stroke twice as long as the eccentric amount $\epsilon2$ of the second eccentric ring 49.

Figure 2:
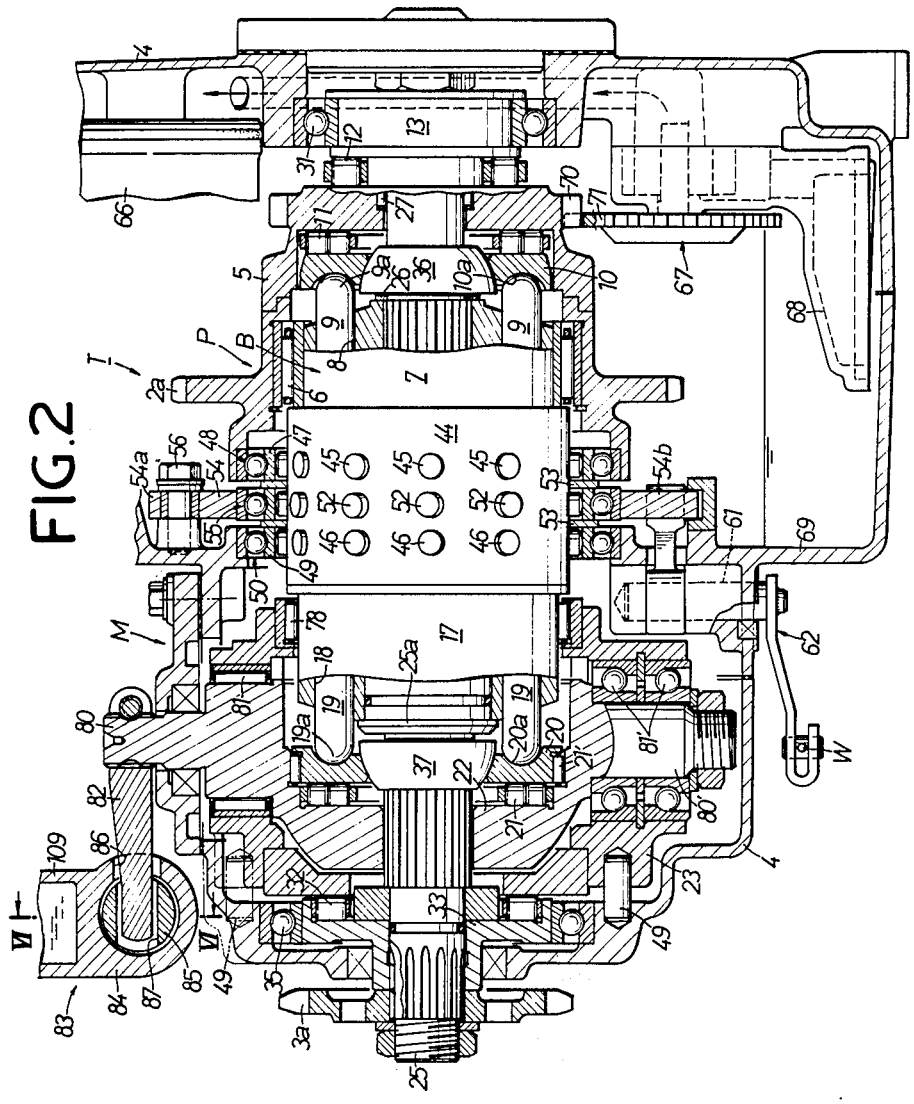

As shown in FIG. 2, a pair of trunnion shafts 80 and 80' are integrally provided at the opposite ends of the swashplate holder 22 to align on the tilting axis O of the motor swashplate 20 and rotatably journaled on the swashplate anchor 23 through a needle bearing 81 and a roller bearing 81', respectively. In other words, the tilting axes O are provided by these trunnion shafts 80 and 80'.

An operating lever 82 is fixedly mounted on the outer end of one trunnion shaft 80. If the trunnion shaft 80 is turned by the operating lever 82, the swashplate holder 22 integral with the trunnion shaft 80 is also turned and even during rotation of the motor swashplate 20, the swashplate holder can be freely tilted.

The swashplate anchor 23 is supported on the outer periphery of the motor cylinder 17 through a needle bearing 78 and connected to the crank case 4 through a pair of locating pins 49, 49 against the rotation around the output shaft 25.

With the above arrangement, when the input member 5 of the hydraulic pump P is rotated through the primary reduction gear 2, the pump swashplate 10 allows the suction and discharge strokes to be alternately provided to the pump plungers 9, 9 . . . , and the first dispensing valve 45 adjacent to the pump plunger 9 which comes to the suction stroke is operated into the inner position in cooperation of the first eccentric ring 47 with the follower ring 47', while the first dispensing valve 45 adjacent to the plunger 9 which comes to the discharge stroke is operated into the outer position in cooperation of the first eccentric ring 47 and the follower ring 47'. Therefore, each pump plunger 9 operates to suck an working from the inner hydraulic chamber 40 into the cylinder bore 8 in the suction stroke and to pump the working oil from the cylinder bore 8 into the outer hydraulic chamber in the discharge stroke.

The higher pressure working oil fed into the outer oil chamber 41 is passed into the cylinder bore 18 containing the motor plunger 19 which is in the expansion stroke through the second dispensing valve 46 controlled into the outer position by the second eccentric ring 49 and the follower ring 49', while the working oil within the cylinder bore 18 containing the motor plunger 19 which is in the contraction stroke is discharged into the inner oil chamber 40 through the second dispensing valve 46 controlled into the inner position by the second eccentric ring 49 and the follower ring 49'.

During this operation, the cylinder block B is rotated by the sum of a reaction torque received by the pump cylinder 7 from the pump swashplate 10 through the pump plunger 9 which is in the discharge stroke and a reaction torque received by the motor cylinder 17 from the motor swashplate 20 through the motor plunger 19 which is in the expansion stroke, and the rotational torque of the cylinder block B is transmitted from the output shaft 25 to the secondary reduction gear 3.

In this case, the gear shift ratio of the output shaft 25 to the input member 5 is given by the following equation:

$$\text{Gear shift ratio} = 1 + \frac{\text{Capacity of the hydraulic motor } M}{\text{Capacity of the hydraulic pump } P}$$

Therefore, if the capacity of the hydraulic motor M is changed from zero to a certain value, the gear shift ratio can be changed from 1 to a certain required value.

Because the capacity of the hydraulic motor M is determined by the stroke of the motor plunger 19, the gear shift ratio can be controlled in a continuously variable manner from 1 to a certain value by providing the tilting movement of the motor swashplate 20 from the upright position to a certain tilted position.

During such an operation of the hydraulic pump P and the hydraulic motor M, the pump swashplate 10 receives a thrust load from the pump plungers 9, 9 . . . and the motor swashplate 20 receives a thrust load from the motor plungers 19, 19 . . . , these thrust loads being in the opposite direction to each other. The thrust load received by the pump swashplate 10 is sustained on the output shaft 25 through the thrust roller bearing 11, the input member 5, the thrust roller bearing 12, the support sleeve 13 and the nut 30, while the thrust load received by the motor swashplate 20 is similarly sustained on the output shaft 25 through the thrust roller bearing 21, the swashplate holder 22, the swashplate anchor 23, the thrust roller bearing 32, the support sleeve 33, the sprocket 3a and the nut 34. Accordingly, the thrust loads merely produce a tensile stress to the output shaft 25 and do not act on the crank case 4 carrying the shaft 25 at all.

Figure 5:
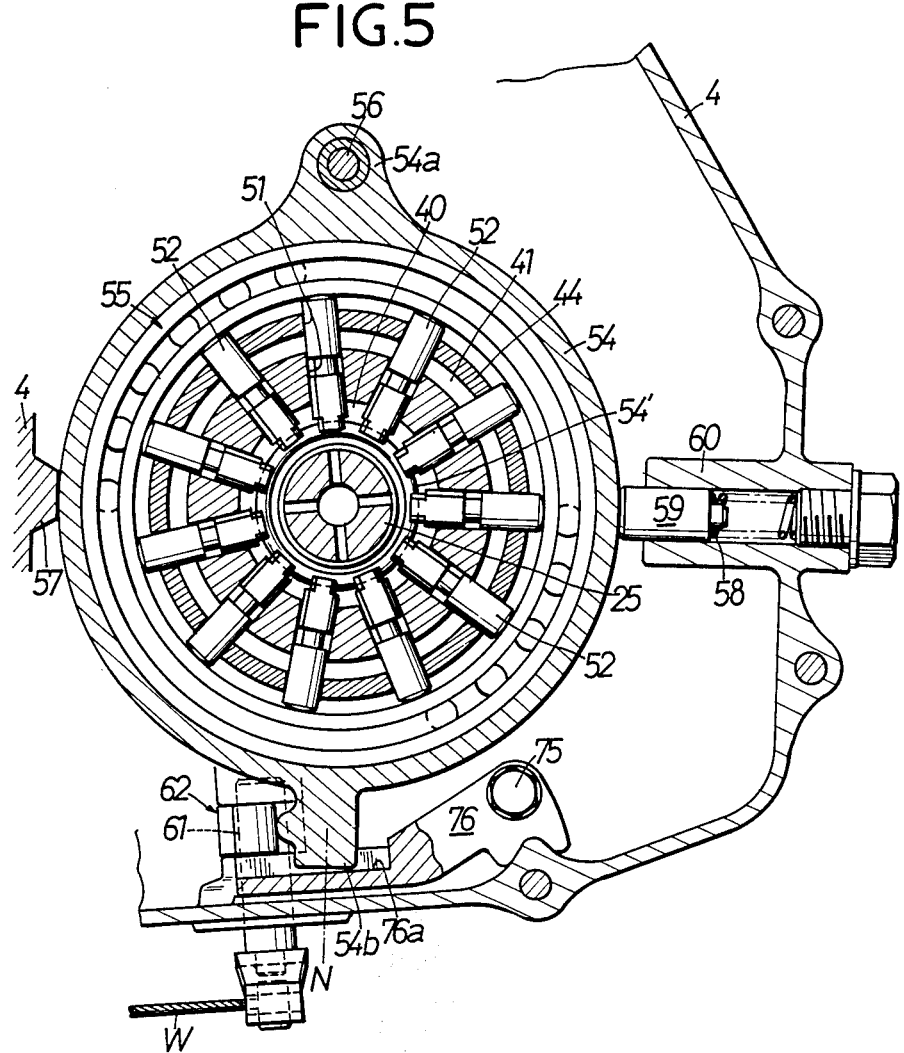

Referring to FIGS. 1 and 5, a plurality of third valve bores 51, 51 . . . are perforated in the cylinder block B between the aforesaid first and second valve bores 42, 42 . . . and 43, 43 . . . to radially penetrate the partition wall between both the aforesaid hydraulic oil chamber 40 and 41 and the sleeve 41, and clutch valves 52, 52 . . . are slidably fitted in these valve bores.

Figure 5A:
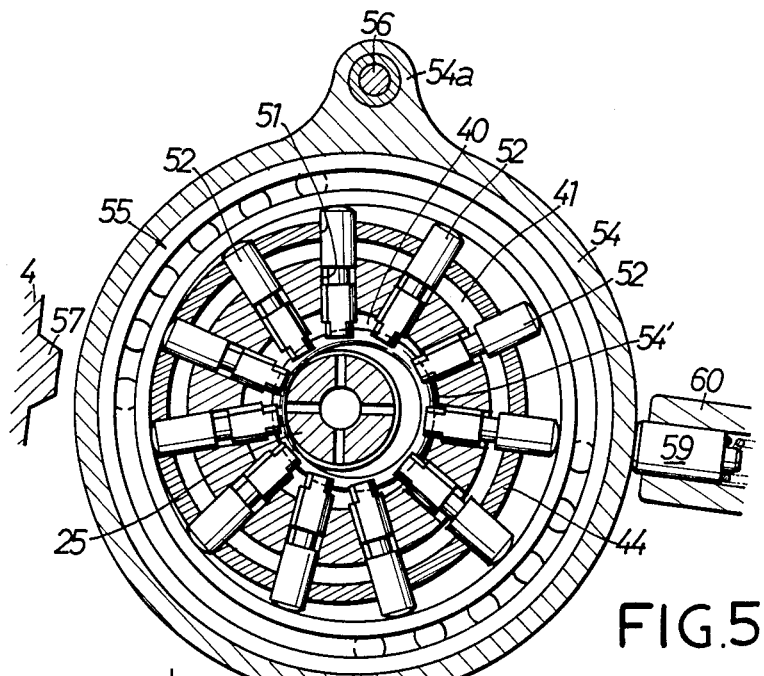
FIG. 5A is an operative view of FIG. 5.
Figure 5B:
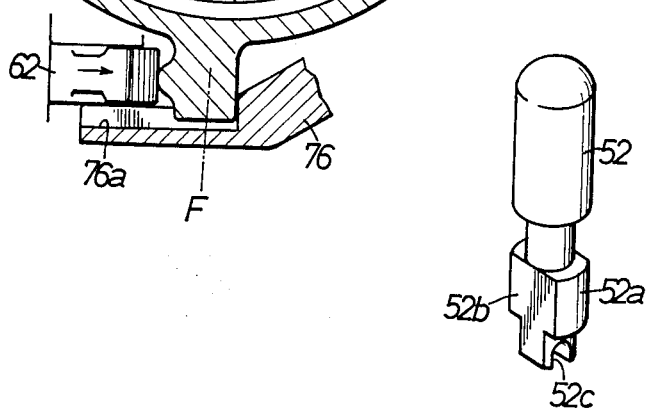
FIG. 5B is a perspective view of a clutch valve shown in FIG. 5.

Each clutch valve 52 is formed into a spool type as shown in FIG. 5B and includes two chamfers 52b and 52b provided on the land portion 52a at the inner end thereof over the entire length of the land portion 52a. When the clutch valve 52 assumes a radially intermediate position or an inner position (clutch ON position) within the third valve bore 51, the third valve bore 51 can be closed to cut off the communication between both the oil chambers 40 and 41, whereas when the clutch valve 52 assumes a radially outer position (clutch OFF position), both the oil chambers 40 and 41 can be brought into communication with each other through the chambers 52b and 52b.

To control the clutch valves 52, 52 . . . , a clutch control ring 54 is engaged with the outer ends of the clutch valves 52, 52 . . . through a release bearing 55 to surround these valves, and a follower ring 54' concentric to the clutch control ring 54 is engaged in engage grooves 52c, 52c . . . at the inner ends of the clutch valves 52, 52 . . . The follower ring 54' is formed from a steel wire and has a single cut to repel the clutch valves 52, 52 . . . toward the engagement with an inner race of the release bearing 55.

The clutch control ring 54 is formed, on the outer surface thereof, with a protruded ear 54a supported through the pivot 56 on the crank case 4 for pivotal movement between a clutch ON position concentric to the output shaft 25 and a clutch OFF position eccentrically displaced with respect to the output shaft 25.

A stopper 57 is integrally formed on the crank case 4 for supporting one side surface of the clutch control ring 54 to limit the clutch ON position N of the clutch control ring, and a piston 59 is slidably fitted in a boss 60 integral with the crank case 4 for urging the other side surface of the clutch control ring 54 toward the stopper 57 by the resilient force of a clutch spring 58.

The clutch control ring 54 is integrally formed with a projection 54b on the outer side surface opposite to the ear 54a. A bell crank lever 62 pivoted at 61 on the crank case 4 has one end connected to the projection 54b and the other end to which a clutch operating wire W is connected.

In order to prevent the sideward falling of the clutch control ring 54, the projection 54b is slidably engaged in a guide groove 76a in a guide plate 76 secured to the crank case 4 by a nut 75.

If the projection 54b is urged through the bell crank lever 62 by drawing the clutch operating wire W, the clutch control ring 54 is swung about the pivot 56 to the clutch OFF position F against the urging force of the piston 59 by the clutch spring 58, as shown in FIG. 5A, and the clutch valves 52, 52 . . . are eccentrically displaced with respect to the axis of the output shaft 25 in cooperation of the release bearing 55 with the follower ring 54'. As a result, several clutch valves 52 close to the piston 59 are moved to the outer positions, i.e., the clutch OFF positions, whereby a short-circuit is produced between the lower pressure inner oil chamber 40 and the higher pressure outer oil chamber 41 through such clutch valves 52, so that a working oil is forced to flow out of the outer oil chamber 41 onto the inner oil chamber 40, resulting in an impossibility to supply the hydraulic oil to the hydraulic pump P. Thus, the transmission of power can be cut off between the hydraulic pump P and the hydraulic motor M.

If the drawing of the clutch operating wire W is released, the clutch control ring 54 is returned to the clutch ON position N shown in FIG. 5 by the action of the clutch spring 58 to retain the clutch valves 52, 52 . . . in the positions concentric to the output shaft 25. As a result, the short-circuit between both the oil chambers 40 and 41 is broken off and thus, the transmission of power is restarted from the hydraulic pump P to the hydraulic motor M.

Because the hydraulic pressure of the inner oil chamber always equally acts on the inner ends of all the clutch valves 52, 52 . . . , the urging forces exerted on the clutch control ring 54 by all the clutch valves 52, 52 . . . are balanced. Therefore, the clutch control ring 54 can always be swung smoothly without resistance by the hydraulic pressure of the inner oil chamber 40.

Referring again to FIG. 1, a pair of flange plates 53 and 53 are secured by a smooth snap-in to the outer periphery of the previously described sleeve 44 to intervene between the abov-mentioned three bearings 48, 50 and 55. These flange plates 53 and 53 enable not only the bearings 48, 50 and 55 to be prevented from being mutually interfered with, but also the sleeve 44 to be firmly reinforced, so that the deformation of the sleeve 44 due to the higher hydraulic pressure of the outer oil chamber 41 can be suppressed to ensure the smooth operation of each the valves 45, 46 and 52.

In addition, as seen in FIGS. 1 and 2, a blind oil passage 63 is made in the output shaft 25 at its central portion, and an oil feed pipe 64 is inserted into the opened end of the blind oil passage 63 and supported on the side wall of the crank case 4. The oil feed pip 64 communicates with an oil pan 69 at the bottom of the crank case 4 through an oil passage 65 defined in the side wall of the crank case 4, a filter 66 mounted on such side wall, a supplement pump 67 and a strainer 68, and the supplement pump 69 is driven from the input member 5 through gears 70 and 71. Thus, during rotation of the input member 5, the oil within the oil pan 69 is always supplied into the oil passage 63 by the supplement pump 67.

The oil passage 63 is in communication with the inner oil chamber 40 through a radial supplement hole 72 perforated in the output shaft 25. Further perforated in the output shaft 25 are a first oil feed hole 201 radially extending from the oil passage 63 and opened into the cup-like input member 25 and a second oil passage 202 radially extending from the oil passage 63 and opened into the cup-like swashplate anchor 23. Orifices 203 and 204 are provided in these oil feed holes, respectively. The orifices 203 and 204 permit an appropriate amount of a lubricating oil to be supplied from the oil passage 63 to the interiors of the input member 5 and the swashplate anchor 23, particularly the engagement portions between the spherical ends 9a and 19a of the plungers 9 and 19 and the recesses 10a and 20a, while maintaining the discharge pressure of the supplement pump 67. A check valve 73 is provided in the oil passage 63 for preventing the reverse flow of the oil into the oil feed pipe 64.

Thus, if the working oil leaks out of the hydraulic closed circuit between the hydraulic pump P and the hydraulic motor M during normal load operation, the working oil is supplemented from the oil passage 63 via the supplement hole 72 into the inner oil chamber 40.

During reverse load operation, i.e., engine-brake operation, the oil motor M operates to provide a pumping effect and the hydraulic pump P operates to provide a motoring effect. Therefore, the pressure in the outer oil chamber 41 is changed into a lower level and the pressure in the inner oil chamber 40 is changed into a higher level, and the working oil is intended to reversing flow out of the inner oil chamber 40 into the oil passage 63, but such reverse flow is blocked by the check valve 73. Consequently, a reverse load can be reliably transmitted from the hydraulic motor M to the hydraulic pump P, thus providing a good engine brake effect.

For the purpose of lubricating the slide surface of the pump plunger 9 and the interior of the input member 5, a narrow oil hole 77 is perforated in the pump plunger 9 for permiting the communication between the interior and exterior of the pump plunger 9. In addition, for the purpose of lubricating the slide surface of the motor plunger 19 and the itnerior of the swashplate anchor 23, a narrow oil hole 79 is also perforated in the motor plunger 19 for permiting the communication between the interior and exterior of the motor plunger 19.

Figure 6:
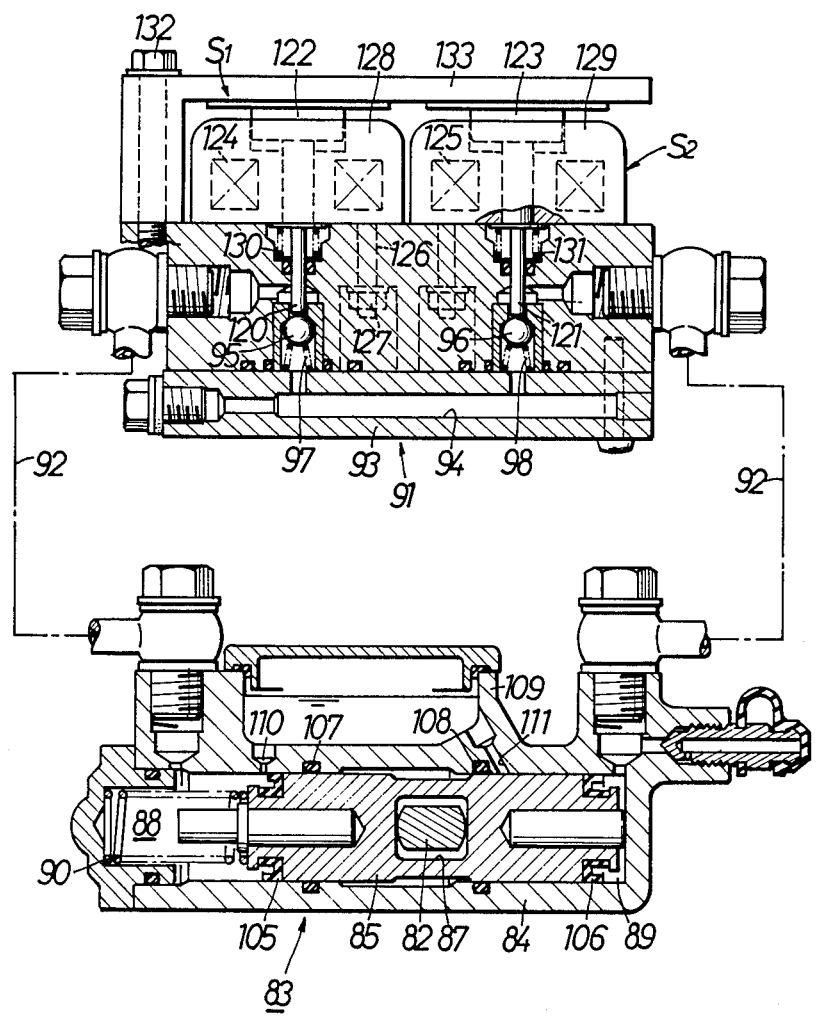
Figure 7:
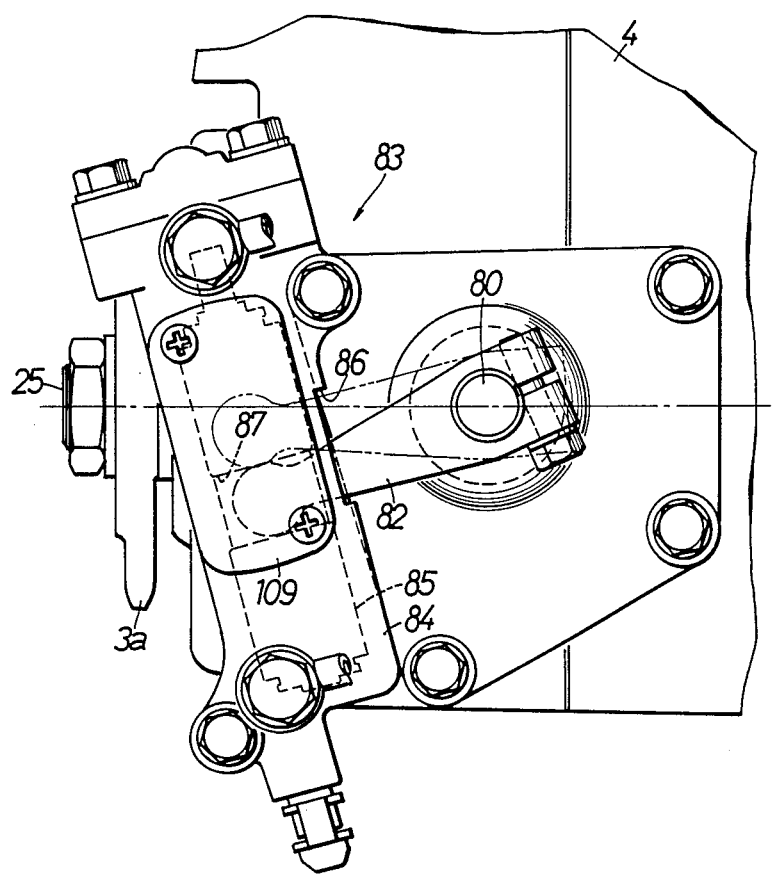

As seen in FIGS. 2, 6 and 7, for the operation of tilting the aforesaid motor swashplate 20, a speed change controller 83 is connected to the operating lever 82 of the trunnion shaft 80.

The speed change controller 83 includes a cylinder 84 secured to the crank case 4 and a piston 85 slidably fitted in the cylinder 84. A window 86 is made in the side wall of the cylinder 84, and a connection hole 87 is made in the central portion of the piston 85 in such a manner to transversely penetrate the piston and face the window 86. The operating lever 82 of the trunnion shaft 80 is passed through the window 86 and engaged in the connection hole 87, so that piston 85 can be slided according to the rotation of the trunnion shaft 80.

As seen in FIG. 6, the leftward movement of the operating lever 82 and thus the piston 85 provides the upright state of the motor swashplate 20. A first oil chamber 88 is defined between the piston 85 and the left end wall of the cylinder 84, and a second oil chamber 89 is defined between the piston 85 and the right end wall of the cylinder 84. A return spring 90 is mounted in compression in the first oil chamber 88 for biasing the piston 85 toward the second oil chamber 89.

The first and second oil chambers 88 and 89 are interconnected through a hydraulic conduit 92 having a speed change control valve 91 provided on the way thereof and are filled with the working oil.

The speed change control valve 91 comprises a valve box placed at a proper location in a vehicle steering device to intervene on the way of the hydraulic conduit 92, and first and second check valves 95 and 96 mounted in series in the oil passage 94 within the valve box 93. The first and second check valves 95 and 96 are arranged in such a manner to have the directions of easy flow opposite to each other and constantly biased toward the opening thereof by valve springs 97 and 98, respectively.

Operating rods 120 and 121 of first and second solenoid actuators S1 and S2 are connected respectively to the first and second check valves 95 and 96 so as to permit the timely forced opening of these valves. The first and second solenoid actuators S1 and S2 are respectively comprised of a movable iron core 122, 123 integrally provided at its fore end with the operating rod 120, 121, a solenoid 124, 125 surrounding the movable iron core 122, 123, an actuator body 128, 129 holding the solenoid 124, 125 and secured to the valve box 93 by a bolt 126 and a nut 127, a return spring 130, 131 for biasing the movable iron core 122, 123 toward the upper inoperative position, and a stopper plate 133 secured to the valve box 93 by a bolt 132 to limit the inoperative position of the movable iron core 122, 123.

In the first and second solenoid actuators S1 and S2, when the solenoid 124, 125 is deenergized, the movable iron core 122, 123 is retained in the inoperative position by the force of the return spring 130, 131, with the operating rod 120, 121 spaced apart from the first and second check valves 95 and 96, whereby the first and second check valves 95 and 96 can be maintained closed. If the solenoid 124, 125 is excited, the movable iron core 122, 123 is moved down against the force of the return spring 130, 131 by the action of the magnetic force, so that the operating rod 120, 121 enables the first and second check valves 95 and 96 to be forcedly opened.

Because the number of the motor plungers 19, 19 . . . are odd, the thrust load exerted on the motor swashplate 20 by the motor plungers 19, 19 . . . during rotation of the motor cylinder 17 is alternately changed over in strength between one side and the other side of the motor swashplate 20 with respect to the tilting axis as a border, and a vibratory tilting torque acts on the motor swashplate 20. Then, the vibratory titling torque acts, in the form of an alternately rightward or leftward urging force, on the piston 85 through the operating lever 82.

Thereupon, if only the first actuator S1 is operated, the first check valve 95 is brought in to an opened state, so that the second check valve 96 permits the flow of the oil from the first oil chamber 88 into the second oil chamber 89, but blocks the flow in the opposite direction. Only when the leftward urging force acts on the piston 85 from the operating lever 82, the oil flows out of the frist oil chamber 88 into the second oil chamber 89. As a result, the piston 85 is moved toward the first oil chamber 88 to cause the operating lever 82 to be returned in a direction of titling movement of the motor swashplate 20 and thus, decelerating operation is effected.

Then, upon operating only the second solenoid actuator S2, the second check valve 96 is now brought into an opened state, so that the first check valve 95 permits the flow from the second oil chamber 89 into the first oil chamber, but blocks the flow in the opposite direction. Only when the rightward urging force acts on the piston 85 from the operating lever 82, the oil flows out of the second oil chamber 89 into the first oil chamber 88. As a result, the piston 85 is moved toward the second oil chamber 89 to cause the returning movement of the operating lever 82 in a direction to bring the motor swashplate upright and thus, accelerating operation is effected.

If the solenoid actuators S1 and S2 both are returned to the inoperative states, both the check valves 95 and 96 closed completely block the flow passing through the valve box 93 in cooperation, so that the piston 85 becomes immobile. In such position, the operating lever 82 is retained, and the motor swashplate 20 is fixed in the upright or inclined position, thus making it possible to hold the now speed change gear ratio.

If the solenoid actuators S1 and S2 both are operated, the oil is permited to freely flow between both the oil chambers 88 and 89. Therefore, if doing so, for example, at the stoppage of the engine, the piston 85, even though it is in the leftward moved position, is rapidly moved to the rightward movement limit by the resilient force of the return spring 90 to turn the operating lever 82 to the most inclined position of the motor swashplate 20 to provide for the restart.

As shown in FIG. 7, the cylinder 84 is disposed at a right angle with respect to the axis of the output shaft 25 or in a near position. If so, when the operating lever 82 urges the piston 85, it is possible to avoid the action of the resulting reaction force on the swashplate anchor 23 through the trunnion shaft 80 in the axial direction of the output shaft 25.

As seen in FIG. 6, a reserve tank 109 is installed on the cylinder 84, and a relief port 110 and supply port 111 are bored in the upper wall of the cylinder 84 for bringing the reserve tank 109 into communication with the interior of the cylinder 84.

First and second cup seals 105 and 106 in close contact with the inner peripheral surface of the cylinder and having a unidirectional sealing function are mounted respectively on the outer peripheries at the left and right ends of the piston 85, and O-rings 107 and 108 in close contact with the outer peripheral surface at the intermediate portion of the piston 85 are mounted on the inner periphery of the cylinder 84 at the laterally opposite sides of the window 86.

The relief port 110 is adapted to be opened into the first hydraulic chamber 88 immediately before the first cup seal 105 when the piston 85 is located in the rightward movement limit, and the supply port 111 is adapted to be always opened into the cylinder 84 between the second cup seal 106 and the O-ring 108.

With the piston 85 being located in the rightward movment limit, as the increase in pressure occurs in the first oil chamber 88 due to the increase in oil temperature or the like, the increased pressure is released through the relief portion 110 into the reserve tank 109. During the leftward movement of the piston 85, the first oil chamber 88 is pressurized by the piston 85 from the instance when the first cup seal 105 has passed the opening of the relief port 110, thereby enabling the flow of the oil out of the first oil chamber 88 into the second oil chamber 89. In this case, if the second hydraulic chamber 89 is depressurized lower than a predetermined pressure, the difference in pressure between the reserve tank 109 and the second oil chamber 89 causes the oil within the reserve tank 109 to be passed through the slide clearance between the inner surface of the cylinder 84 and the piston 85 and to be supplemented into the second oil chamber 89 while flexing the second cup seal 106 toward the second oil chamber 89.

It should be understood that if the inside of the reserve tank 109 has been maintained at a higher pressure, a pretension force is applied to the hydraulic conduit 92 by the hydraulic pressure and hence, the rigidity of the hydraulic conduit 92 against the variation in hydraulic pressure with the operation of the piston 85, thus enabling the operation of the piston 85 to be stabilized.

Figure 8:
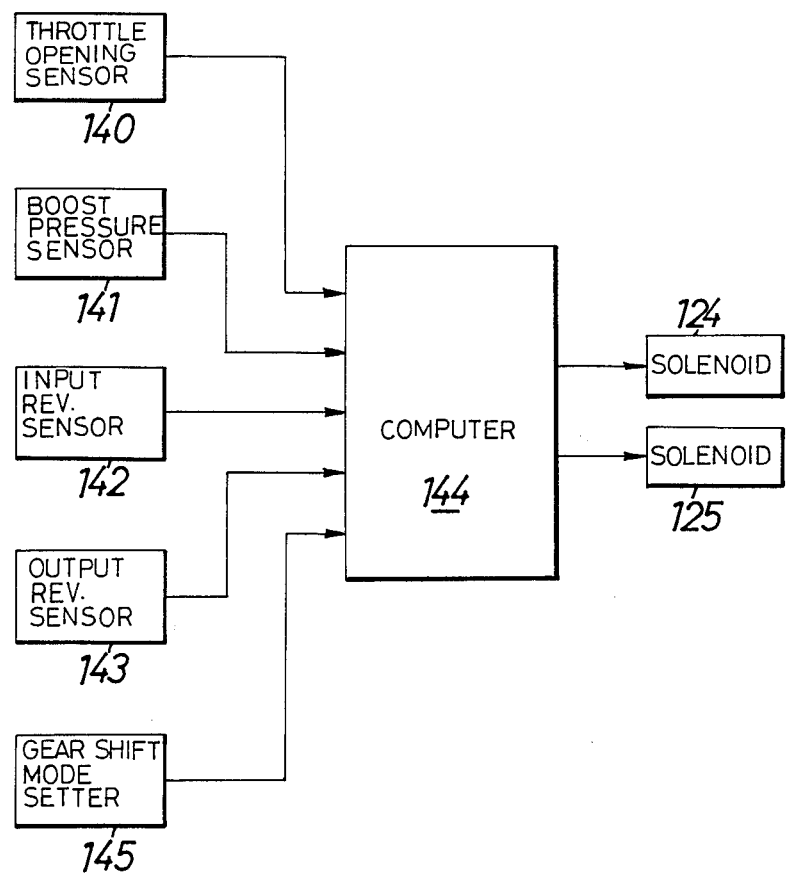

FIG. 8 illustrates one example of an automatic control circuit for the solenoids 124 and 125 of the aforesaid first and second solenoid actuators S1 and S2. In such automatic control circuit, the throttle opening degree and the boost pressure in the engine and the input and output revolutions of the transmission which serve as speed change control factors are detected respectively by a throttle opening degree sensor 140, a boost pressure sensor 141, an input rev. sensor 142 and an output rev. sensor 143, and signals corresponding to the respective detected values are received into a computer 144. Thereupon, the computer 144 compares these siganls with preprogrammed values, and when having decided to decelerate the transmission T, supplies an operating signal to the solenoid 124 of the first solenoid actuator S1 and on the contrary, when having decided to accelerate the transmission, supplies an operating siganl to the solenoid 125 of the second solenoid actuator S2 and further when having decided to hold the speed change ratio, gives a command to stop the output to either solenoids. In this way, the transmission is automatically controlled.

On the other hand, if the operater operates a gear shift mode setter 145 according to the road condition and the serious considerations of lower specific fuel comsuption and higher power or the like, the increase or decrease in reference value recided by the computer 144 can be provided by the corresponding input signal to freely change the gear shift characteristics.

A second embodiment of the present invention will now be described with reference to FIGS. 9 to 11. The sleeve 44 defining the outer oil chamber 41 is oil-tightly fitted in the outer periphery of the cylinder block B through a pair of seal members, for example, O-rings 150 and 151 and secured thereto by a knock pin 151. Each of the first and second dispensing valves 45 and 46 and the clutch valve 52 is divided into a valve portion 45A, 46A, 52A slidably fitted in the valve bore 42, 43, 51 close to the cylinder block B and an operating portion 45B, 46B, 52B slidably fitted in the valve bore 42, 43, 51 close to the sleeve 44, the valve portion 45A, 46A, 52A and the operating portion 45B, 46B, 52B having been located to abut against each other for sliding movement on each other.

With such arrangement, even if the axis of the valve bore 42, 43, 51 close to the cylinder block B is misaligned somewhat from the axis of the valve bore 42, 43, 51 close to the sleeve 44 due to the working error, such a misalignment is absorbed into the lateral sliding movement between the valve portion and the operating portion and hence, each valve 45, 46, 52 can smoothly slide within the valve bore 42, 43, 51 without any gouging. In addition, since each of the operating portions 45B, 46B and 52B may be formed into a sufficiently small diameter, regardless of each valve portion 45A, 46A, 52A, each of the valve bores 42, 43, and 51 can be also formed into a small diameter to dimish the reduction in strength of the sleeve 44 due to the valve bores.

In this case, each of the first and second dispensing valve 45 and 46 has an arcuate guide land 45b, 46b which is provided in projection on the intermeidate portion of the valve portion 45A, 46A thereof and slidably fitted on each the inner walls of the first and second valve bores 42 and 43 (see FIG. 10), whereby the falling of the valve portions 45A and 46A can be prevented without obstructing the flow of the oil in the valve bores 42 and 43.

Those portions of the valve portion 52A of the clutch valve 52 through which the oil is passed are two chamfer portions 52b as shown in FIG. 11.

The follower rings 47', 49' and 54' respectively engaging the inner ends of the first dispensing valves 45 and 46 and the clutch valve 52 are formed from a spring steel plate, and washer 152 and 153 are interposed between these follower rings 47', 49' and 54' for avoiding the mutual interference. The follower rings 47', 49' and 54' and the washers 152 and 153 have a notch or a smaller hole made at place therein for preventing the flow of the oil through the inner oil chamber 40 from being obstructed.

The other construction is similar to that in the previously described embodiment, and in FIGS. 9 to 11, the same reference characters are used to designate the same portions as in the previous embodiment.

Figure 12:
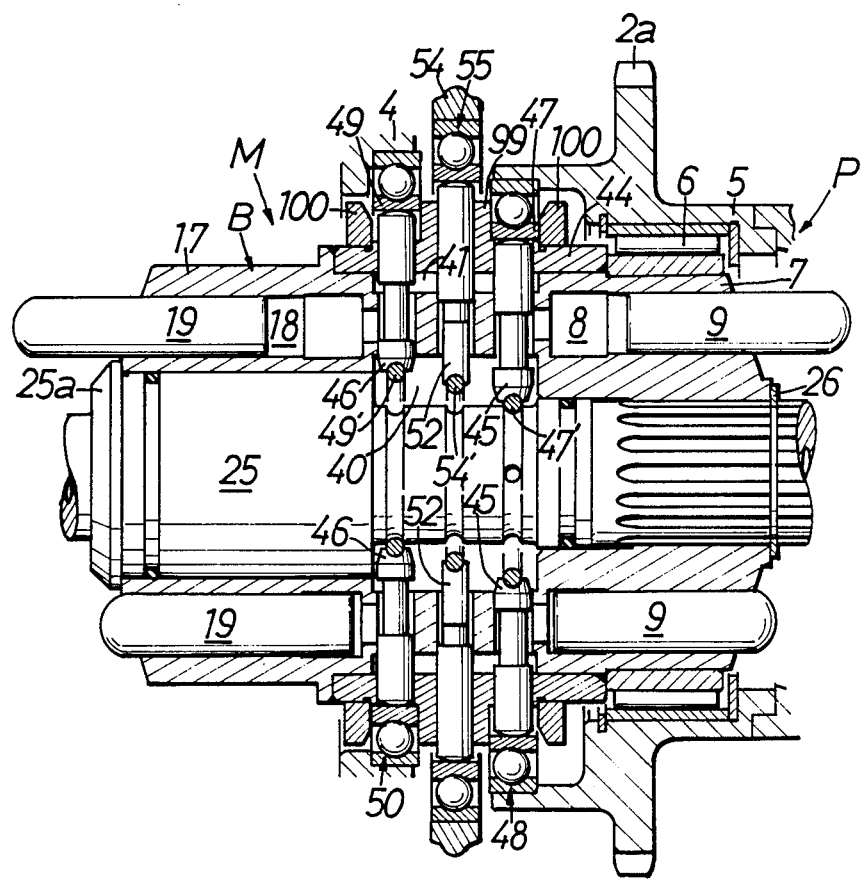
FIG. 12 is a vertical sectional view of details of a static hydraulic continuously variable transmission according to a third embodiment of the present invention.

FIG. 12 illustrates a third embodiment of the pesent invention. A static hydraulic continuously variable transmission according to the third embodiment is basically of the same construction as in the previous first embodiment, except that an annular reinforcing rib 99 penetrated by the clutch valves 52, 52 . . . is integrally provided on the central outer peripheral surface of the sleeve 44 in such a manner to be sandwiched between both the eccentric rings 47 and 49, and annular reinforcing flange plates 100 are also snapped over and secured to the outer peripheral surfaces at the opposite ends of the sleeve 44 in such a manner to clamp both the eccentric rings 47 and 49 therebetween, thereby reinforcing the rigidity of the sleeve 44, while at the same time, preventing the falling of both the eccentric rings 47 and 49. In FIG. 12, the same reference characters are used to denote the same portions as in the first embodiment.

What is claimed is:

1. A clutch valve system for use in a static hydraulic continuously variable transmission in which a hydraulic closed circuit is formed between a swashplate type hydraulic pump and a swashplate type hydraulic motor, wherein a first annular oil chamber and a second annular oil chamber are concentrically defined in the pump cylinder adjacent to annularly arranged cylinder bores of a pump cylinder to the hydraulic pump, the first oil chamber being adapted to be connected to the cylinder bores which are in a discharge stroke and the second oil chamber being adapted to be connected to the cylinder bores which are in a suction stroke;

a plurality of clutch valves are radially arranged in the pump cylinder for providing the communication or discommunication between both the oil chambers by the radial movement thereof; and a clutch control ring engaged with the clutch valves for relative rotation therebetween so as to surround these clutch valves is pivoted on a fixing structure for pivotal movement between a clutch ON position in which it brings all the clutch valves into a closed state in the diametrical direction of the pump cylinder and a clutch OFF position in which it brings some of the clutch valves into an opened state.

2. A clutch valve system according to claim 1, wherein means is mounted for radially guiding the swinging movement of said clutch control ring.

3. A clutch valve system according to claim 1, wherein said clutch control ring abuts against the outer end of said individual clutch valves in a concentric state with respect to said pump cylinder in said clutch ON position, and in the eccentric state with respect to said pump cylinder in said clutch OFF position.

4. A clutch valve system for use in a static hydraulic continously variable transmission which comprises a hydraulic pump, a hydraulic motor, and a hydraulic closed circuit between said pump and motor and including a first annular oil chamber as a high pressure oil chamber and a second annular oil chamber as a low pressure oil chamber, one of the first and second oil chambers encircling the other, said first oil chamber being placed in communication with said hydraulic pump during discharge strokes of the pump and said second oil chamber being placed in communication with the pump during suction strokes thereof, the clutch valve system comprising a plurality of clutch valves which are disposed radially in said hydraulic closed circuit, each of said clutch valves being radially movable between a first position at which a pressure in said high pressure oil chamber is maintained at a high level and a second position at which the pressure in said high pressure oil chamber is reduced to a low level, wherein said system is adapted to assume a clutch ON state in which all the clutch valves are at the first position maintaining the pressure in said high pressure oil chamber at said high level and a clutch OFF state in which a part of the clutch valves come to the second position thereby reducing the pressure in said high pressure oil chamber to said low level.

* * * * *